United States Patent [19]

Cecil

[11] 4,313,176

[45] Jan. 26, 1982

[54] DATA CONTROLLED SWITCH FOR TELEPHONE INPUTS TO A COMPUTER

[75] Inventor: Lon V. Cecil, Ada, Okla.

[73] Assignee: The Lockwood Association, Inc., San Antonio, Tex.

[21] Appl. No.: 128,294

[22] Filed: Mar. 7, 1980

[51] Int. Cl.³ .............................................. G06F 3/00
[52] U.S. Cl. ...................................................... 364/900
[58] Field of Search ... 364/900 MS File, 200 MS File

[56] References Cited

U.S. PATENT DOCUMENTS

| | | | |
|---|---|---|---|
| 3,676,858 | 7/1972 | Finch et al. | 364/200 |
| 3,699,525 | 10/1972 | Klavins | 364/200 |
| 3,749,845 | 7/1973 | Fraser | 364/200 |
| 3,771,135 | 11/1973 | Huettner et al. | 364/200 |
| 3,833,892 | 9/1974 | Marsalka et al. | 364/900 |

Primary Examiner—Leo H. Boudreau

Attorney, Agent, or Firm—Gunn, Lee & Jackson

[57] ABSTRACT

A solid state, data controlled switch is provided to interface between a central processing computer and either a keyboard with an operator display, or a telephone input via a data access arrangement and modem. Since the input from the telephone is normally at a much slower baud rate than the baud rate at which central processing computer operates, the solid state switch increases the baud rate per character of the telephone input to allow the central processing computer to continue to operate at its maximum baud rate and hence maximum capacity. By pre-programming the solid state, data controlled switch internally with a designated code, upon the designated code being received by the data controlled switch, it will electronically switch the central processing computer from the keyboard input to the telephone input, or vice versa.

10 Claims, 5 Drawing Figures

DATA CONTROLLED SWITCH FOR TELEPHONE INPUTS TO A COMPUTER

BACKGROUND OF THE INVENTION

In many businesses across the country, a central processing computer will process data input from a number of operator terminals that are connected to the computer via cables. This data is typed into the terminal on its keyboard for input to the computer, and the computer sends data to the terminal for display on the cathode ray tube (CRT) of the terminal. Information may be either fed from many terminals to the central processing computer, or from a central processing computer to the terminals, simultaneously. For example, in a typical system involving a mini-computer as the central processing computer, the mini-computer would operate approximately ten or twelve terminals. In addition to these operator terminal inputs over cables, the mini-computer may have inputs that are received from the telephone lines.

In a typical telephone input for prior systems, the information received from the telephone lines is fed through a data access arrangement (DAA) into a modulator/demodulator (modem) and input to the mini-computer. Typically, the information being fed to the mini-computer over the telephone line is fed into the telephone by a data entry terminal located remote from the mini-computer or even another computer. (The information being received over the telephone line is fed through a DAA due to the Federal Communications Commission (FCC) requirement.) Because the mini-computer has a limited number of inputs, it is desirable to share an input between (1) the operator terminal which inputs data through cable, and (2) the device which inputs data over telephone lines.

In the past, for the mini-computer to share an input, the computer would be switched from the operator terminal to the telephone input received through the modem by using a switch such as a relay or by changing wiring by hand. After transmission, the relay or wiring would be changed to switch the mini-computer back to the operator terminal. In this manner, the information being received from the remote location of the data entry terminal can be received by the mini-computer for validation and processing. The input would then be switched back to the operator terminal so the mini-computer can display on the CRT the results of the transmission. The operator would then be able to make any changes or corrections that would be necessary via the keyboard of the operator terminal. The speed at which this type of operation is completed is of great concern, as well as the differences between computer operating speed and telephone transmission speeds.

For the operation to begin and end in the least amount of time, the switching of the inputs must be done as quickly as possible, preferably by some device more reliable and faster than a relay. Further, in prior switching devices using a relay to switch between the telephone line input and the operator terminal, the switching of the relay had to be done manually. There was no provision for a preprogrammed switch that would switch between the telephone line input and the operator terminal as controlled by a program in the mini-computer, nor based upon signals being received from the data entry terminal.

Most importantly, there was no provision provided in prior systems to compensate for differences between the speed of the computer and the speed at which data is transferred over telephone lines. That is, prior devices were unable to change the baud (bits per second) rate of the information received over the telephone line input, to the baud rate of the mini-computer; and they were not able to select more than one baud rate for receiving a transmission over telephone lines. This capability is required because the mini-computer works with the operator terminal at a higher baud rate (9600 baud) than the rate at which data is received via telephone lines (usually from 300 to 1200 baud). Any faster baud rate over standard voice-grade/dial-up telephone lines (the least expensive type) is not normally feasible because of interference with random electrical spikes or static noise. Further, the speed-compensation and selectable baud rate are necessary so that the mini-computer will be able to maximize the processing of data received from devices which operate at difference speeds.

Further, in prior systems nothing would prevent data from going from the central processing computer through the modem and DAA, over the phone line to the telephone line input. For obvious security reasons, this is very undesirable.

SUMMARY OF THE INVENTION

It is an object of the present invention to provide a data controlled switch that will automatically switch between an operator terminal and a telephone input.

It is another object of the present invention to provide a data controlled solid state switch that will automatically shift between an operator terminal and a telephone input via a data access arrangement and modem upon receiving a predetermined code from a program in a computer.

It is still another object of the present invention to provide a means for automatic operation and verification of information received over telephone lines from remote locations by a keyboard operator at an operator terminal to quickly correct or change any data received over telephone inputs from a data entry terminal at a remote location.

It is yet another object of the present invention to permit the selection of various baud rates at which it is to receive telephone line input, and to increase the rate of transmission of information being received through a telephone input and data entry terminal to a higher rate at which the central processing computer normally operates, thereby enabling the receipt of data from devices which have different operating speeds.

It is another object of the present invention to prevent unauthorized access to any data contained in the central processing computer via telephone line inputs. This is accomplished by changing the baud rate inside the solid state switch for data received from the telephone line input, but not for data received from the central processing computer.

It is even another object of the present invention to provide a highly reliable, fast response, non-manual program controlled switching to switch the central processing computer between the telephone line input and the operator terminal.

The solid state, data controlled switch interfaces between a central processing computer and (1) an operator terminal and/or (2) a data entry terminal received over a telephone line. The operator terminal has an operator display composed of a cathode ray tube (hereinafter referred to as CRT) and a keyboard. The operator terminal receives and feeds data to the central processing computer via the data controlled switch. The data entry terminal is a hand-held device normally used by a field salesman on which he would type in his orders. Thereafter, the salesman would telephone an operator at the home office. The operator at the home office would initiate the execution of a program in the central processing computer from the operator terminal and listen for a transmission from the salesman. The salesman would then attach the telephone receiver to a data entry terminal, and then activate the terminal. The data entry terminal would then transmit a tone and then the orders. When the operator hears the tone, he would lift an exclusion key on a telephone set to remove (exclude) the receiver of the operator from the telephone line so no noise is induced into the receiving line by the operator. The operator then presses a key on the operator terminal to signal the computer program that it should cause the data control switch to switch the input line from the operator terminal to the modem. The program then transmits a special character to the data controlled switch and the switch responds by linking the modem to the computer and detaching the operator terminal. The orders, in the form of transmission signals, are then transmitted to the computer from the data entry terminal. These orders are received at the local end through a data access arrangement (hereinafter referred to as DAA). From the DAA, the information would feed through a modulator/demodulator (hereinafter referred to as modem) into the data controlled switch. (The information being received from the data entry terminal of the field salesman is at a lower baud rate of 1200 baud or less. The central processing computer normally communicates with the data controlled switch at a higher speed, such as 9600 baud.)

Simultaneously, inside of the data controlled switch, each series of bits representing a character received from the modem are assembled and stored. The assembled data is fed out one character at a time to the central processing computer at the higher baud rate at which the central processing computer operates, such as 9600 baud. Over typical telephone lines, approximately 1200 baud is the maximum rate at which data can be transmitted due to noise or interference problems. On a specially noisy line, this sometimes must be reduced to as slow as 300 baud to insure all of the information is being properly transmited without receiving noise or interference spikes.

Upon completion of the transmission, the program in the computer outputs of the data controlled switch a second control character. This causes the data controlled switch to transfer the communication line of the computer from the modem back to the operator terminal. The program then displays the orders on the CRT for verification by the operator. Any corrections, deletions, or special instructions are made at this time. Assume, for example, that one item is out of stock, the salesman may either delete (short) the item or substitute an item for the out-of-stock item. The operator's and salesman's phones are then hung up and the operation is complete.

The data controlled switch is preprogrammed internally, prior to the above operation, so that if the particular coded character it receives from the program matches the internally coded character, the data controlled switch will transfer the input line to either the modem input received over the telephone lines, or the operator terminal input. These preprogrammed character codes are preset in the data controlled switch at the time of installation. Also, the data controlled switch may be set for various baud rates that may be used over the telephone lines at the time of installation, such as 1200 baud, 600 baud, or 300 baud. This would depend upon the amount of noise on the telephone line. Since the solid state data controlled switch normally operates at different voltage levels than its inputs and outputs, level shifters are necessary to change the voltage level of the received and transmitted information. Internally, the data controlled switch receives information from the modem in a serial-to-parallel converter and clocks it into a parallel-to-serial converter to be fed out at a much higher baud rate per character to the central processing computer. In case there is malfunction, a reset switch resets all internal components of the solid state data controlled switch to a known condition. Indicator lights on the data controlled switch show whether or not the central processing computer is connected to the modem input from the telephone line or to the keyboard input at the operator terminal.

By design, data from the central processing computer cannot be fed to the telephone line either by program control, physical rewiring, mis-wiring of connectors and jumper, or other changes. The baud speed-up technique will not convert the 9600 baud rate from the central processing computer to any lower speed that will transmit on the telephone lines. This prevents any intentional or accidental attempts to access computer data files by a remote terminal, thereby providing a data security not found with other direct telephone line to computer interface adapters available from the computer manufacturers.

DESCRIPTION OF THE PREFERRED EMBODIMENT

Figure 1:
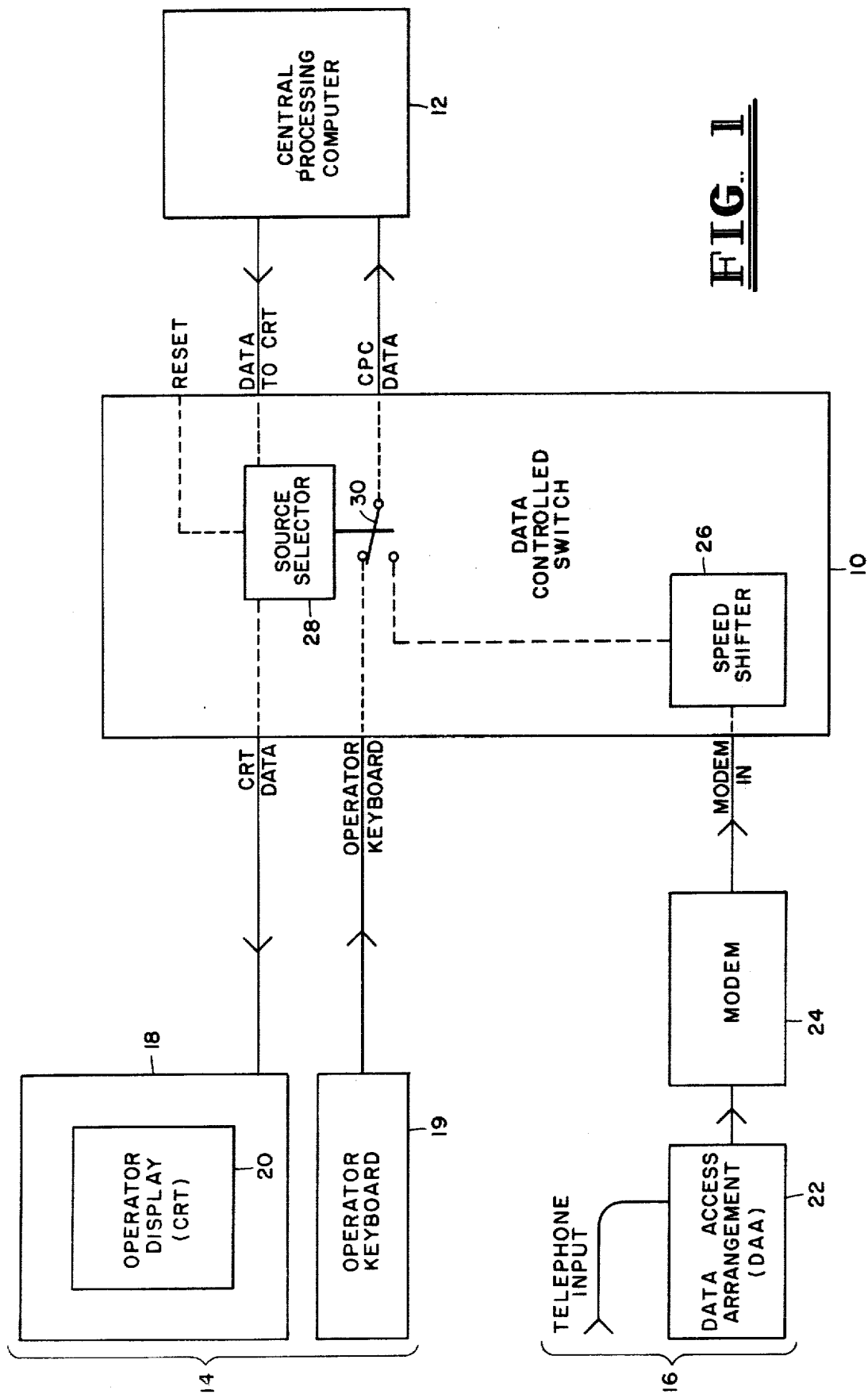
FIG. 1 is an illustrated, block diagram showing interconnections with a solid state, data controlled switch in operation to switch a central processing computer between a telephone input and an operator terminal.

Referring now to FIG. 1 of the drawings, there is pictorially shown in a functional block diagram the interconnection of a solid state, data controlled switch 10 interfacing a central processing computer 12, an operator terminal 14 and a telephone input 16 from a data entry terminal (not shown). The operator terminal 14 includes an operator display 18 using a cathode ray tube 20 (hereinafter referred to as CRT) to display the information for the operator as received from the central processing computer 12 through the data controlled switch 10. The telephone input 16 is received over a telephone line typically from a remote location. At the remote location data is fed over the telephone input via a data entry terminal (not shown) into a data access arrangement 22 (hereinafter referred to as DAA) as is required by the Federal Communications Commision. From the DAA, the information is fed into a modem 24, from the modem 24 through the data controlled switch 10 into the central processing computer 12.

A modem is a combination modulator and demodulator at each end of a telephone line that is used to convert binary digital information to audio tone signals suitable for transmission over the telephone line, and vice versa. A modem is also known as a dataset and the term is derived from "modulator-demodulator."

The information being received from the telephone input 16 is typically at 300, 600, or 1200 serial baud rate; however, other baud rates in a similar range may be used with the baud rate being depended upon the amount of noise or interference on the telephone line. The information received on the telephone input 16 is fed via the DAA 22 and modem 24 into a speed shifter 26 of the data controlled switch 10. By use of a proper selection code as will be hereinafter discussed in more detail, the source selector 28 will change switch 30 so that information from speed shifter 26 feeds directly into the central processing computer 12. Inside of the speed shifter 26 information is received at a serial baud rate of a much lower speed and it is subsequently fed out of the speed shifter 26 a character at a time at a much higher serial baud rate. For the purposes of illustration, assume that information is being received into the speed shifter 26 at a 1200 baud rate and is fed out at a 9600 baud rate, a character at a time. The source selector 28 is preprogrammed so that upon receiving a given command signal from the central processing computer 12, switch 30 will be changed from the telephone input 16 to the operator terminal 14, or vice versa.

A typical operating environment of the data controlled switch 10 will be explained in this paragraph. The DAA 22 and the modem 24 may be off-the-shelf components manufactured by Universal Data Systems with the modem 24 being Model UDS-202C. The central processing computer may be an NCR computer of the 8200 series with a typical model number being NCR 8250. The operator terminal 14 may be a typical unit manufactured by Applied Digital Data Systems, but sold by NCR under the NCR label as NCR 796-101. While a typical operating environment has been explained in this paragraph for the data controlled switch 10, the data controlled switch 10 may be used in conjunction with numerous other types of equipment. Typically, the central processing computer 12 is a minicomputer with the NCR 8200 series being a typical such mini-computer.

Figure 2:
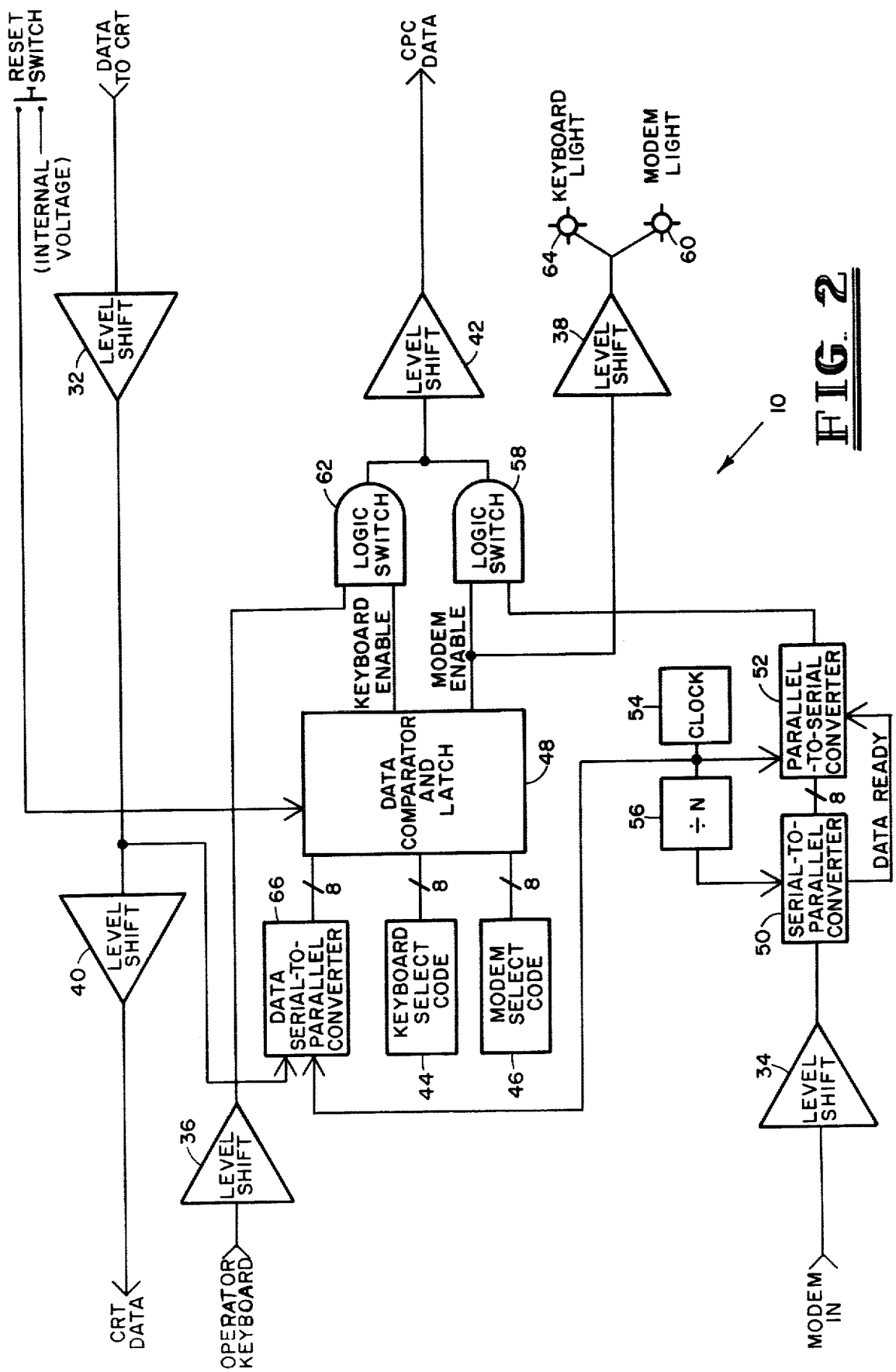
FIG. 2 is a block diagram of the internal components of the solid state, data controlled switch.

Referring now to FIG. 2, the data controlled switch 10 is shown in more detail by way of a functional block diagram. All information is transferred in data format in accordance with the American Standard Code for Information Interchange (hereinafter referred to as ASCII). For an example, an ACSII character may consist of a series of bits of information that represent that character. The data transmission protocol is in conformance with the Electric Industry Association's standard commonly referred to as RS232. However, this is not a requirement of the present invention which may handle any number of bits, or any asyncronous data format of not over eight data bits.

In the present invention, the applicant found that it was more desirable to use CMOS type logic which operates at a different voltage level than the data being transmitted between the operator terminal 14, telephone input 16, and the central processing computer 12. Therefore, internally within the data controlled switch 10 it became necessary to change the logic level either upward or downward, depending upon whether the signals are feeding in or out of the data controlled switch 10. For example, level shifters 32, 34, and 36 of FIG. 2 shift the voltage level downward to typical levels used in CMOS logic and level shifters 38, 40, and 42 shift the voltage level of the data upward. Internally within the data controlled switch 10, even though not shown in the drawings, is located power supply voltages of +5 volts, +12 volts, and −12 volts. These voltage levels are necessary to operate the logic as contained in the data controlled switch 10.

Internally within the data controlled switch 10 is a keyboard select code 44 and a modem select code 46. Both the keyboard select code 44 and the modem select code 46 comprise a series of eight switches that are manually set and continuously feed into a data comparator and latch 48 over eight parallel lines. Once a signal has been received by the data comparator and latch 48 from the central processing computer that matches either the keyboard select code 44 or the modem select code 46, the data comparator and latch 48 generates the respective enable signal "modem enable" or "keyboard enable". Assume that first the modem enable signal has been created. Thereafter, telephone input 16 feeds through the modem in FIG. 2 and the level shift 34 to the serial-to-parallel converter 50. Once eight bits of information are received by the serial-to-parallel converter 50 (one of the bits being a parity bit), a data ready signal is fed into the parallel-to-serial converter 52. Upon the next signal being received from clock 54, the information contained in the serial-to-parallel converter 50 is transferred to the parallel-to-serial converter 52.

Typically the information being received into the serial-to-parallel converter 50 is at a 1200 baud rate or less. Information being transferred from the parallel-to-serial converter 52 is at a 9600 baud rate. Therefore, the clock 54 must operate at a frequency sufficiently large to accomodate the 9600 baud rate. The same clock 54 operates the serial-to-parallel converter 50 through a $\div N$ circuit 56 with N being the numeral 8 or $9600/8 = 1200$. For ease and convenience, it is best if the numeral N is a unit two multiple; however, this is not essential.

Once the information is received into the parallel-to-serial converter 52, it is clocked out by clock 54 at a 9600 baud rate through logic switch 58 and level shift 42 to the central processing computer as CPC data. The logic switch 58 also must have a modem enable input from the data comparator and latch 48 which is given when the modem select code 46 is received by the data comparator and latch 48. Simultaneously the modem enable code operates through level shift 38 to turn ON the modem light 60.

Assume now that a character is received by the data comparator and latch 48 which matches the keyboard select code 44. This will cause the data comparator and latch 48 to give a keyboard enable signal into logic switch 62 and remove the modem enable from logic switch 58. The removal of the modem enable from logic switch 58 and level shifter 38 will cause the modem light 60 to go out and the keyboard light 64 to light up. Thereafter, if the operator feeds data through the level shifter 36 into the logic switch 62, it would feed through the level shift 42 into the central processing computer as CPC data.

Internally within the data controlled switch 10, the data comparator and latch 48 operate off of parallel logic; therefore, information being received from the central processing computer 12 is fed through data serial-to-parallel converter 66. This occurs after the time the telephone line signals have been fed to the central processing computer, when a program in the central processing computer sends to level shift 32 a serial signal to indicate the transmission is complete. This signal must match the signal from the keyboard select code 44, so the data comparator and latch 48 can compare the outputs from the data serial-to-parallel converter 66, keyboard select code 44 or the modem select code 46.

Figure 3A:
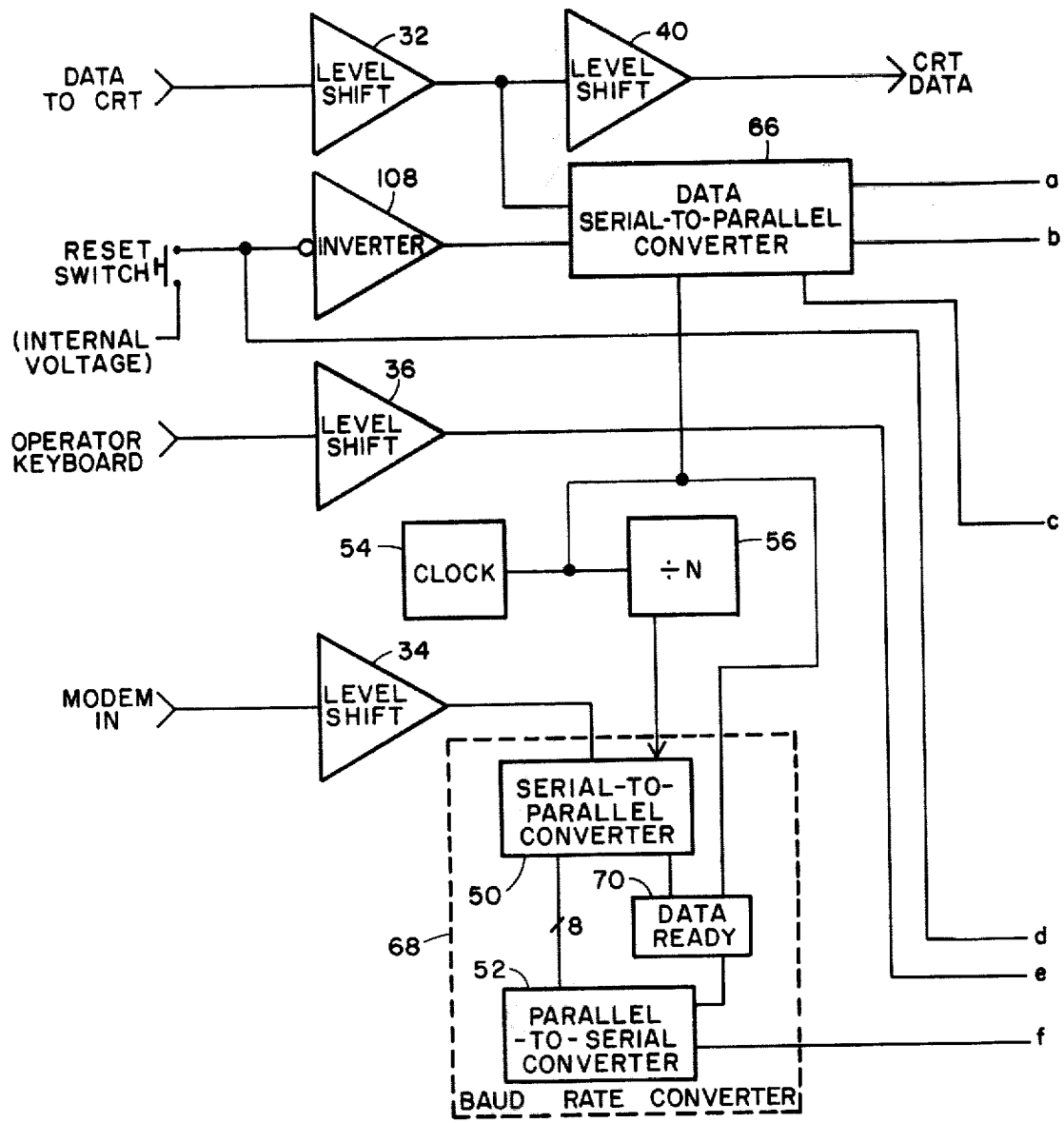
FIGS. 3a and 3b are functional, logic diagrams of the solid state, data controlled switch.
Figure 3B:
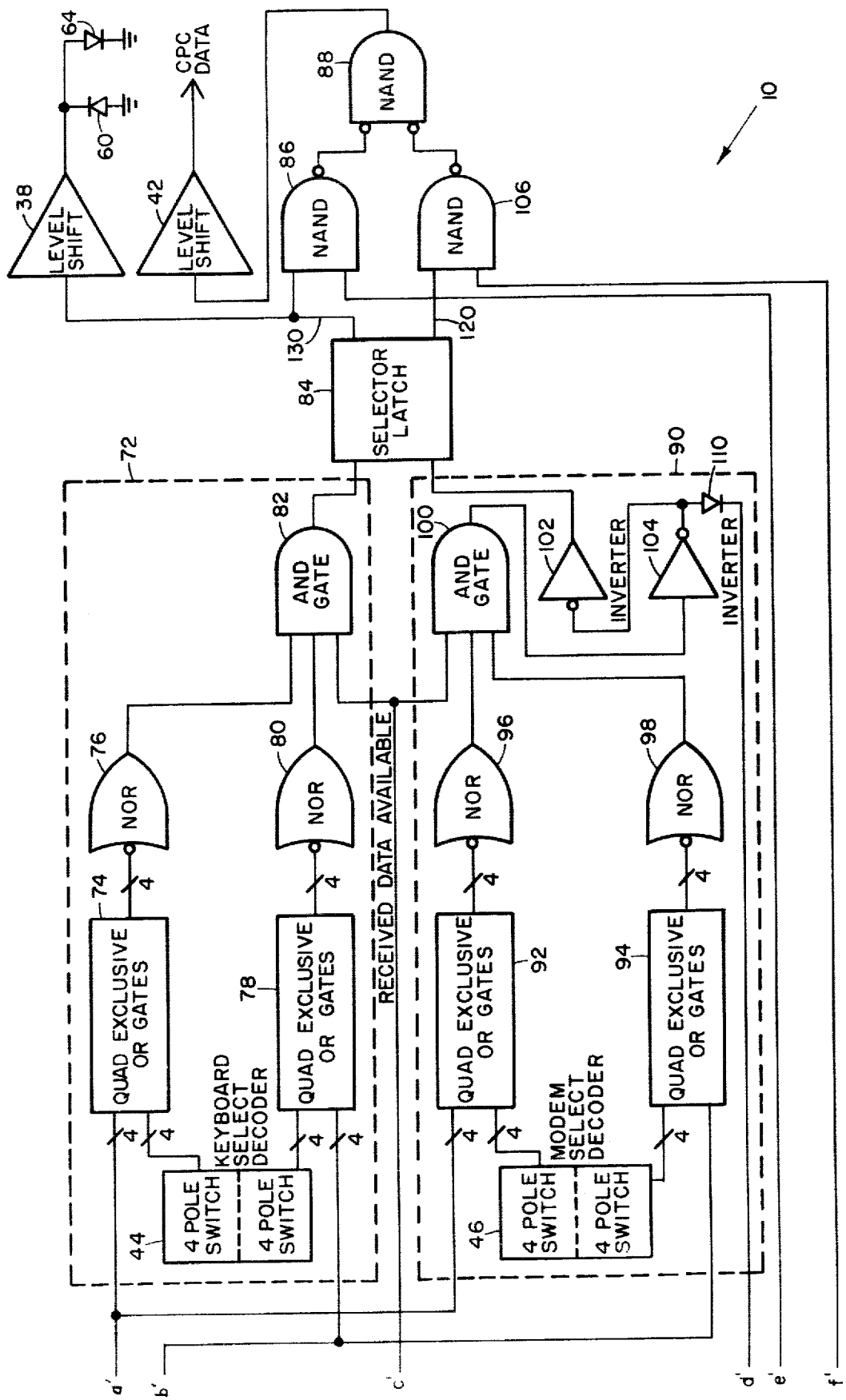

Referring now to FIGS. 3a and 3b of the drawings (which constitute one figure connected by a-a', b-b', c-c', d-d', e-e' and f-f'), each of the component parts of the data controlled switch 10 as shown in a block diagram of previously described FIG. 2 are now described in terms of functional logic diagrams with off-the-shelf components. The same numeral designation as previously used in FIG. 2 will again be used in FIGS. 3a and 3b where applicable with additional numeral designations. Referring first to the modem in, the signal received through the level shift 34 feeds into a block generally designated as a baud rate converter 68 which includes the previously discussed serial-to-parallel converter 50 and parallel-to-serial converter 52. The data ready 70 provides a pulse gate that is controlled by clock 54 to clock information from the serial-to-parallel converter 50 to the parallel-to-serial converter 52.

The previously discussed keyboard select code 44 is provided by two 4 pole switches that would be manually set to give an 8 digit code. The keyboard select code 44 is contained as part of a larger keyboard select decoder 72. The output from one of the 4 pole switches of keyboard select code 44 feeds into a quad exclusive OR gates 74, which is simply four exclusive OR gates connected together. Each exclusive OR in quad exclusive OR 74 has one line from the data serial-to-parallel converter 66 and one line from the 4 pole switch of keyboard select code 44. If both of the inputs match, the output of the quad exclusive OR gates 74 will go high thereby triggering NOR gate 76. The circle in front of NOR gate 76 represents an inversion prior to receipt of the signal. Circles that appear in FIGS. 3a and 3b represent an inversion of the signal.

Likewise the other half of the keyboard select 44 is again provided by a 4 pole switch that feeds through quad exclusive OR gates 78 that are identical to the previously described quad exclusive OR gates 74. The output from the quad exclusive OR gates 78 feeds through NOR gate 80 the same as the output of NOR gate 76. If both of the NOR gates 76 and 78 provide an input signal to AND gate 82, which means that the code as set in by the keyboard select code 44 and the 4 pole switches contained therein has been matched by the signal from the data serial-to-parallel converter 66, then received data available feeds from the data serial-to-parallel converter 66 through the AND gate 82 into the selector latch 84. The output 130 from the selector latch 84 causes the keyboard light 64 to be lit through level shifter 38. Likewise the output 130 from the selector 84 will feed to NAND gate 86 to permit data from the operator keyboard to be fed through the level shift 36 and NAND gates 86 and 88 to the level shifter 42 to the central processing computer as data. The selector latch 84 output 120 disables any modem in data which may reach NAND gate 106.

Contained in a modem select decoder 90 is the modem select code 46 which again consists of two 4 pole switches, the outputs of which feed into quad exclusive OR gates 92 and 94. The modem select decoder 90 is identical to the keyboard select decoder 72 with a different code being programmed in by means of the modem select code 46 and the 4 pole switches contained therein. If the outputs from the modem select code 46 match the signal being received from the data serial-to-parallel converter 66, outputs will be fed through NOR gates 96 and 98 to AND gate 100. Outputs from NOR gates 96 and 98 are received by AND gate 100, and thereby permit AND gate 100 to transmit received data available from the data serial-to-parallel converter 66 through AND gate 100. From AND gate 100, the received data available signal feeds through a double inversion network formed by inverters 102 and 104 into the selector latch 84. The output 120 from the selector latch will then feed to NAND gate 106 to enable data from the modem in level shift 34, and baud rate converter 68 to feed through NAND gates 106 and 88 and the level shifter 42 to the central processing computer as data. Also, the selector latch 84 output 130 will be fed to level shift 38, the keyboard light 64 will go out, the modem light 60 will light up, and the NAND gate 86 will be disabled so data from the operator keyboard will not go to the NAND gate 88.

The modem light 60 and keyboard light 64 are provided by light emitting diodes which are used as indicators.

The reset connects through inverter 108 into the data serialtoparallel converter 66 to restore a known condition in case there is a failure in the data transmission. Also the reset signal connects through diode 110 which will reset the selector latch 84 to a known condition, but will not allow a signal to be fed backwards through diode 110 to inverter 108.

To provide a typical indicator of the off-the-shelf components that can be used in the solid state data controlled switch 10 as shown in FIGS. 3a and 3b, a table of typical component parts is attached hereto. Many of the component parts may be manufactured by a number of manufacturers, such as Motorola, RCA, General Instruments, Texas Instruments, or others.

Figure 4:
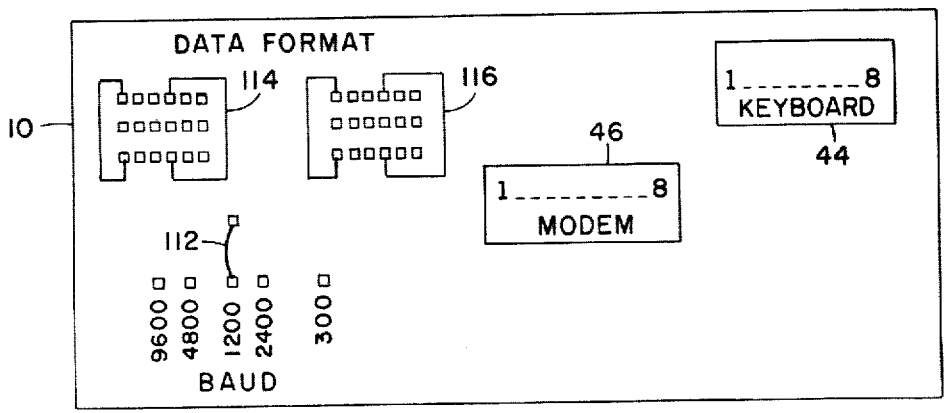
FIG. 4 is an illustrated schematic of the internal settings of the solid state, data controlled switch at the time of a typical installation.

Referring now to FIG. 4, there is shown a pictorial top view of the data controlled switch 10 with the cover removed. Once it is determined what particular baud rate the incoming data from the telephone input 16 is going to be received at by the data controlled switch, a jumper 112 physically indicates inside of the data controlled switch 10 the baud rate of the incoming information. In the current case, the jumper 112 indicates that the information being received via the telephone input is at a 1200 baud rate. However, it should be realized that a panel switch could be used. The keyboard select code 44 physically programs in the code that is necessary to call up the keyboard by the setting of the manual switches as previously described. Likewise the modem select code 46 physically programs in the code necessary to select the telephone input 16. Both the keyboard select code 44 and the modem select code 46 constitute physical switches that program in either predetermined digits in the data controlled switch 10.

Jumpers 114 and 116 strap the operator keyboard 19 and the CRT 20 to a particular data format. These may be changed if the CRT 20 or the operator keyboard 19 may operate at a different data format. Most CRTs physically have a switch inside thereof that may be used to change the transmission format information from the CRT. Whatever format the CRT is set at, the jumpers 114 and 116 will likewise set the data controlled switch 10 to the same format.

TABLE

| REFERENCE NUMERALS | MANUFACTURER | PART NO. | DESCRIPTION |
| --- | --- | --- | --- |
| 66, 50, 52 | General Instruments | TR 1602 | Serial-to-parallel converter |
| 32, 36, 34 | National Semiconductor | LM1489A | Level shift |
| 38, 40, 42 | National Semiconductor | LM1488 | Level shift |
| 74, 78, 92, 94 | National Semiconductor | CD4070BC | Quad exclusive OR gates |
| 76, 80, 96, 98 | National Semiconductor | CD4002BC | NOR gates |
| 84 | National Semiconductor | CD4013BC | Selector latch |
| 86, 88, 106 | National Semiconductor | 74LS00P | NAND gate |
| 102, 104, 108 | National Semiconductor | CD4069C | Inverter |
| 56 | National Semiconductor | 74C93 | Divider |
| 54 | National Semiconductor | NE567 | Clock |
| 70 | National Semiconductor | 74C10 | Data ready |
| 44, 46 | Sanford Applied Engineering | 7641 | 4 pole switches |
| 110 | Sanford Applied Engineering | IN4148 | Diode |
| 60, 64 | Hewlett-Packard | 5082-4655 | Light emmitting diodes |
| 82, 100 | National Semiconductor | IN4148 | AND Gates |

I claim:

1. A device for switching a central processing computer between a telephone input received through a data access arrangement and modem, and an operator terminal including a visual display and operator keyboard, said device comprising:
   means for electrically connecting said device to said central processing computer, said modem and said operator terminal;
   means for setting a keyboard select code and modem select code into said device;
   means for comparing incoming data to determine if said keyboard select code or said modem select code have been selected and latching into the selected condition;
   speed shifter means receiving telephone data from said modem and upon selecting said modem select code increasing baud rate of each character of said telephone data to a predetermined baud rate of said central processing computer; and
   logic means for passing data at said predetermined baud rate to said central processing computer from either said speed shifter or said operator keyboard depending upon which of the aforesaid codes have been selected.

2. The device as given in claim 1 wherein said means for setting includes manual switches internally set for keyboard select code and said modem select code.

3. The device as given in claim 2 including a data serial-to-parallel converter connected to said means for comparing, said data serial-to-parallel converter changing incoming data from said modem and said central processing computer to parallel for comparing with said codes.

4. The device as given in claims 1 or 3 wherein said means for comparing includes logic gates so that all inputs must match either said keyboard select code or said modem select code prior to said latching into said selected condition.

5. The device as given in claim 4 wherein said logic means is controlled by said logic gates.

6. The device as recited in claim 1 comprising level shifting means on all inputs and outputs of said device to allow said device to operate at lower voltages than data being transmitted therethrough.

7. The device as recited in claim 1 or 3 wherein said speed shifter includes:
   a serial-to-parallel converter receiving said character from said modem;
   a parallel-to-serial converter connected to said serial-to-parallel converter;
   clock means for clocking said character into said parallel-to-serial converter from said serial-to-parallel converter and thereafter from said parallel-to-serial converter at said predetermined baud rate.

8. The device as recited in claim 7 wherein clock means is a free running oscillator that has a frequency output divided by a multiple of two to give a clock frequency for said telephone data; said frequency output providing a clock for said parallel-to-serial converter.

9. The device as recited in claim 1 comprising means for resetting said device to a known condition including said means for comparing and latching.

10. The device as recited in claim 1 comprising visual indicator operated by said means for comparing and latching to indicate which of said codes had been selected.

* * * * *